United States Patent
Watson et al.

(10) Patent No.: US 12,453,333 B2
(45) Date of Patent: Oct. 28, 2025

(54) CONVERTIBLE PET-CARRYING AND BACKPACKING BACKPACK

(71) Applicant: K9 Sport Sack LLC, Orem, UT (US)

(72) Inventors: Joseph Watson, Orem, UT (US); Spencer Kottcamp, Orem, UT (US); Tyler J. Egbert, Bountiful, UT (US)

(73) Assignee: K9 Sport Sack LLC, Lehi, UT (US)

(*) Notice: Subject to any disclaimer, the term of this patent is extended or adjusted under 35 U.S.C. 154(b) by 354 days.

(21) Appl. No.: 17/151,002

(22) Filed: Jan. 15, 2021

(65) Prior Publication Data

US 2022/0225592 A1 Jul. 21, 2022

(51) Int. Cl.
*A01K 1/00* (2006.01)
*A01K 1/02* (2006.01)
*A45F 3/04* (2006.01)
*B65F 1/00* (2006.01)
*A45F 3/00* (2006.01)

(52) U.S. Cl.
CPC ............ *A01K 1/029* (2013.01); *A01K 1/0254* (2013.01); *A45F 3/04* (2013.01); *B65F 1/0006* (2013.01); *A45F 2003/003* (2013.01); *A45F 2003/045* (2013.01); *B65F 2240/136* (2013.01)

(58) Field of Classification Search
CPC .... A01K 1/0236; A01K 1/0254; A01K 1/029; A45F 2003/003; A45F 2003/045; A45F 3/04; B65F 1/0006; B65F 2240/136
See application file for complete search history.

(56) References Cited

U.S. PATENT DOCUMENTS

| | | |
|---|---|---|
| D57,526 S | 4/1921 | Hunt |
| D111,138 S | 9/1938 | Firle |

(Continued)

FOREIGN PATENT DOCUMENTS

| | | |
|---|---|---|
| CA | 187374 S | 9/2020 |
| CA | 197855 S | 2/2022 |

(Continued)

OTHER PUBLICATIONS

Amazon, "K9 Sport Sack 1 Dog Carrier Backpack for Small and Medium Pets . . . ", First review Jan. 4, 2016. (https://www.arnazon.coM/dp/B07HZ6BVQ4?th=1) (Year: 2016).

(Continued)

*Primary Examiner* — Richard T Price, Jr.
(74) *Attorney, Agent, or Firm* — TraskBritt

(57) ABSTRACT

A convertible pet-carrying and backpacking backpack that comprises a backpack body defining one or more internal compartments and an open top operable to allow the head of a pet to extend therethrough. The backpack body further comprises shoulder straps extending from the front of the backpack body, and paw holes disposed on the front of the backpack body above the shoulder straps. The paw holes are operable to allow paws of the pet to extend therethrough. The backpack can further comprise an accessory bag operable to selectively attach to and detach from the backpack body at a first position where the accessory bag extends from the back of the backpack body so that the backpack is in a pet-carrying configuration, and a second position where the accessory bag covers the open top of the backpack body so that the backpack is in a backpacking configuration.

11 Claims, 9 Drawing Sheets

(56) References Cited

U.S. PATENT DOCUMENTS

| | | | |
|---|---|---|---|
| D132,469 S | 5/1942 | Murphy | |
| 2,407,787 A * | 9/1946 | Kernahan | A45F 3/04 |
| | | | 224/655 |
| 3,019,952 A | 2/1962 | Brewster | |
| 3,481,517 A | 12/1969 | Aukerman | |
| D220,414 S | 4/1971 | Marshall | |
| 4,018,369 A | 4/1977 | Jaeger | |
| 4,096,978 A * | 6/1978 | Noice | A45F 3/04 |
| | | | D3/217 |
| 4,194,656 A | 3/1980 | Zufich | |
| 4,318,502 A | 3/1982 | Lowe et al. | |
| 4,434,920 A | 3/1984 | Moore | |
| 4,884,731 A | 12/1989 | Sibley | |
| 4,923,104 A | 5/1990 | Rice et al. | |
| 4,941,603 A | 7/1990 | Creamer et al. | |
| D331,660 S | 12/1992 | Souhrada et al. | |
| 5,176,102 A | 1/1993 | Tracy | |
| 5,184,762 A | 2/1993 | Nevitt | |
| D333,565 S | 3/1993 | Imbert | |
| D334,253 S | 3/1993 | Balzarini | |
| 5,193,486 A | 3/1993 | Kitchens | |
| 5,246,152 A | 9/1993 | Dotseth | |
| D340,354 S | 10/1993 | Wrath | |
| 5,292,043 A * | 3/1994 | McHale | A45F 3/04 |
| | | | 224/261 |
| 5,297,835 A | 3/1994 | Wengler | |
| 5,419,281 A | 5/1995 | Williams et al. | |
| 5,467,907 A | 11/1995 | Celik | |
| D370,090 S | 5/1996 | Coggins | |
| 5,644,902 A | 7/1997 | Kemp | |
| D383,305 S | 9/1997 | Holstrom | |
| 5,662,339 A | 9/1997 | Svendsen et al. | |
| D392,798 S | 3/1998 | Gelb | |
| 5,730,347 A | 3/1998 | Finot | |
| 5,887,772 A | 3/1999 | Dooley | |
| 5,934,527 A * | 8/1999 | Von Neumann | A45F 3/042 |
| | | | 224/582 |
| 5,964,470 A | 10/1999 | Syendsen et al. | |
| D418,972 S | 1/2000 | Gold | |
| 6,202,910 B1 | 3/2001 | Swetish | |
| D460,614 S | 7/2002 | Reimers et al. | |
| 6,481,606 B2 | 11/2002 | Pickett | |
| D472,047 S | 3/2003 | Vazquez | |
| D480,843 S | 10/2003 | Sullivan | |
| 6,637,367 B1 | 10/2003 | Dost et al. | |
| 6,701,871 B1 | 3/2004 | Johnson | |
| D552,848 S | 10/2007 | Ellerby et al. | |
| D553,350 S | 10/2007 | Dvorak | |
| D554,853 S | 11/2007 | Bihn | |
| 7,370,608 B1 | 5/2008 | Friedman | |
| D607,640 S | 1/2010 | Emile | |
| D615,757 S | 5/2010 | Kostner | |
| D616,611 S | 5/2010 | Lu | |
| D630,427 S | 1/2011 | McGuire | |
| 7,918,192 B1 | 4/2011 | Digh et al. | |
| D650,576 S | 12/2011 | Bertken | |
| D664,765 S | 8/2012 | Saia | |
| D683,537 S | 6/2013 | Bandru | |
| D692,654 S | 11/2013 | Irwin et al. | |
| D693,569 S | 11/2013 | Lehan | |
| D699,940 S | 2/2014 | Robert | |
| D699,941 S | 2/2014 | Robert | |
| D710,085 S | 8/2014 | Szewczyk | |
| 9,044,080 B2 | 6/2015 | Ashenafi | |
| D734,942 S | 7/2015 | Robinson et al. | |
| D737,046 S | 8/2015 | Robert | |
| 9,101,199 B1 * | 8/2015 | Harry | A01K 1/029 |
| D737,568 S | 9/2015 | Robert | |
| D739,653 S | 9/2015 | Majeau et al. | |
| D745,777 S | 12/2015 | Zwetzig et al. | |
| D758,715 S | 6/2016 | Daniel et al. | |
| D764,873 S | 8/2016 | Collie | |
| D771,947 S | 11/2016 | Tong | |
| D778,051 S | 2/2017 | Johnson | |
| D778,595 S | 2/2017 | Zurowski | |
| D779,823 S | 2/2017 | Barenbrug | |
| D780,454 S | 3/2017 | Zwetzig et al. | |
| D784,685 S | 4/2017 | Newson | |
| D787,815 S | 5/2017 | Davison | |
| D796,187 S | 9/2017 | Bogue | |
| D798,043 S | 9/2017 | Sassi | |
| 9,756,920 B2 | 9/2017 | Spears | |
| D818,262 S | 5/2018 | Schofield | |
| D819,328 S | 6/2018 | Muhlenkamp, IV | |
| D822,378 S | 7/2018 | Franek | |
| D824,660 S | 8/2018 | Ross | |
| D828,112 S | 9/2018 | Furneaux et al. | |
| D829,435 S | 10/2018 | Viger et al. | |
| D849,399 S | 5/2019 | Christophe | |
| 10,321,661 B2 | 6/2019 | Kath | |
| D852,492 S | 7/2019 | Anderson | |
| D856,661 S | 8/2019 | Lee | |
| D858,977 S | 9/2019 | Owens | |
| D876,081 S | 2/2020 | Dumas | |
| D876,826 S | 3/2020 | Watson et al. | |
| D878,036 S | 3/2020 | Watson et al. | |
| D880,952 S | 4/2020 | Mitchell et al. | |
| 10,617,096 B2 | 4/2020 | Watson et al. | |
| D885,690 S | 5/2020 | Han et al. | |
| D890,515 S | 7/2020 | Oviedo Polanco | |
| D893,811 S | 8/2020 | Wu | |
| 10,799,003 B2 | 10/2020 | Bradley et al. | |
| D904,756 S | 12/2020 | Lu | |
| D908,975 S | 1/2021 | Watson | |
| D909,049 S | 2/2021 | Watson | |
| D910,243 S | 2/2021 | Watson | |
| 10,952,522 B2 * | 3/2021 | D'Alessandro | A45F 3/047 |
| D915,762 S | 4/2021 | Li | |
| D924,559 S | 7/2021 | Li | |
| D931,600 S | 9/2021 | Huang | |
| D942,142 S | 2/2022 | Mandos | |
| 11,272,685 B2 | 3/2022 | Watson et al. | |
| D970,881 S | 11/2022 | Watson | |
| D970,882 S | 11/2022 | Watson | |
| 11,540,487 B2 | 1/2023 | Watson | |
| D979,225 S | 2/2023 | Watson | |
| D982,309 S | 4/2023 | Watson | |
| 2002/0074372 A1 | 6/2002 | Pickett | |
| 2002/0108982 A1 | 8/2002 | Mydans | |
| 2002/0124808 A1 * | 9/2002 | Zampelli | A45F 3/00 |
| | | | 119/497 |
| 2003/0127060 A1 * | 7/2003 | Yeung | A01K 1/0254 |
| | | | 119/497 |
| 2003/0205601 A1 | 11/2003 | Kilduff | |
| 2005/0045674 A1 | 3/2005 | Rehbein | |
| 2006/0037562 A1 | 2/2006 | Woerner | |
| 2006/0213944 A1 * | 9/2006 | Dieter | A45F 3/04 |
| | | | 224/648 |
| 2007/0012261 A1 | 1/2007 | Altieri | |
| 2007/0017947 A1 | 1/2007 | Fenton et al. | |
| 2007/0169719 A1 | 7/2007 | Chang | |
| 2007/0278263 A1 | 12/2007 | Zak et al. | |
| 2008/0029565 A1 * | 2/2008 | Enriquez | A45F 3/04 |
| | | | 224/647 |
| 2008/0054040 A1 | 3/2008 | Tanaka | |
| 2008/0066689 A1 | 3/2008 | Martz | |
| 2008/0116026 A1 * | 5/2008 | Bass | A45C 7/0086 |
| | | | 190/1 |
| 2008/0149673 A1 | 6/2008 | Slater | |
| 2008/0156275 A1 | 7/2008 | Lam | |
| 2008/0216764 A1 | 9/2008 | Porter | |
| 2008/0277435 A1 | 11/2008 | Jones | |
| 2009/0026241 A1 | 1/2009 | Leyendecker | |
| 2009/0127299 A1 * | 5/2009 | Jamlang | A45F 3/14 |
| | | | 224/153 |
| 2010/0199927 A1 | 8/2010 | Cigard et al. | |
| 2011/0083933 A1 | 4/2011 | Engel | |
| 2011/0278337 A1 | 11/2011 | Chiu | |
| 2011/0278338 A1 | 11/2011 | Darnell, II et al. | |
| 2011/0284608 A1 | 11/2011 | Staudecker et al. | |
| 2012/0006865 A1 * | 1/2012 | Su | A45F 3/04 |
| | | | 224/153 |
| 2013/0177264 A1 | 7/2013 | Utterback | |
| 2013/0221051 A1 | 8/2013 | Hairston et al. | |

(56) References Cited

U.S. PATENT DOCUMENTS

| | | | |
|---|---|---|---|
| 2013/0277407 A1* | 10/2013 | Murdoch | A45F 3/04 224/639 |
| 2014/0060453 A1 | 3/2014 | Shewfelt | |
| 2015/0374139 A1 | 12/2015 | Salazar et al. | |
| 2016/0015003 A1 | 1/2016 | Watson et al. | |
| 2016/0100673 A1 | 4/2016 | Demskey | |
| 2016/0227730 A1* | 8/2016 | Rivera | A01K 1/029 |
| 2017/0172102 A1 | 6/2017 | Rivera | |
| 2017/0215385 A1 | 8/2017 | Hansen et al. | |
| 2018/0139921 A1 | 5/2018 | Kath | |
| 2018/0139922 A1 | 5/2018 | Watson et al. | |
| 2018/0146756 A1 | 5/2018 | Meservey | |
| 2018/0154203 A1 | 6/2018 | Schromm | |
| 2018/0228120 A1 | 8/2018 | Laicheng | |
| 2019/0254400 A1* | 8/2019 | Challa | A45C 13/103 |
| 2019/0281962 A1* | 9/2019 | Edgel | A45F 3/005 |
| 2020/0029533 A1 | 1/2020 | Badr | |
| 2020/0060222 A1 | 2/2020 | Watson | |
| 2020/0100469 A1 | 4/2020 | Elam | |
| 2020/0128943 A1 | 4/2020 | D'Alessandro | |
| 2020/0229580 A1 | 7/2020 | Cigard et al. | |
| 2020/0352294 A1 | 11/2020 | Davis | |
| 2022/0015328 A1* | 1/2022 | Ross | A01K 1/0064 |
| 2022/0061262 A1 | 3/2022 | Watson | |
| 2022/0061263 A1 | 3/2022 | Watson | |
| 2023/0172344 A1 | 6/2023 | Armitage | |
| 2023/0232783 A1 | 7/2023 | Wang | |

FOREIGN PATENT DOCUMENTS

| | | |
|---|---|---|
| CN | 201005216 Y | 1/2008 |
| CN | 202535860 U | 11/2012 |
| CN | 203353366 U | 12/2013 |
| CN | 203493023 U | 3/2014 |
| CN | 303221063 | 5/2015 |
| CN | 303342928 | 8/2015 |
| CN | 204733728 | 11/2015 |
| CN | 304021795 | 2/2017 |
| CN | 206150107 U | 5/2017 |
| CN | 304922920 S | 12/2018 |
| CN | 305122160 | 4/2019 |
| CN | 209268299 U | 8/2019 |
| CN | 306365217 | 3/2021 |
| DE | 202011102300 U1 | 1/2012 |
| DE | 202014007394 | 4/2015 |
| EM | 000042999-0004 | 6/2003 |
| EM | 006395372-0001 | 4/2019 |
| EM | 006395372-0002 | 4/2019 |
| FR | 2668044 | 4/1992 |
| GB | 2436735 A | 10/2007 |
| GB | 6016752 | 8/2017 |
| GB | 9006395372-0002 | 4/2019 |
| GB | 6128720 | 4/2021 |
| IN | 298348-0001 | 6/2019 |
| JP | 03-167159 A | 7/1991 |
| JP | H05-046264 U | 6/1993 |
| JP | 2000-287574 A | 10/2000 |
| JP | 3167159 U | 4/2011 |
| JP | D1609184 S | 7/2018 |
| JP | D1621362 S | 1/2019 |
| KR | 20-0335245 Y1 | 12/2003 |
| KR | 30-0640-7780000 | 4/2012 |
| KR | 10-1525981 B1 | 6/2015 |
| KR | 10-1535826 B1 | 7/2015 |
| KR | 300823841.0000 | 11/2015 |
| KR | 10-2019-0056722 A | 5/2019 |
| KR | 30-1051144 | 3/2020 |
| KR | 301136355.0000 | 11/2021 |
| RU | 00084313 | 2/2013 |
| RU | 127653 U1 | 5/2013 |
| RU | 00127653 | 9/2021 |
| SG | 20141329F-0001 | 12/2014 |
| TW | M444711 U | 1/2013 |
| TW | 514722 U | 1/2016 |
| TW | M514722 U | 1/2016 |
| TW | D180162 S | 12/2016 |
| TW | D182034 S | 4/2017 |
| TW | D190435 S | 5/2018 |
| TW | D194326 S | 12/2018 |
| WO | WO 1997/037529 A1 | 10/1997 |
| WO | WO 2008/153252 A1 | 12/2008 |
| WO | WO 2016/096150 A1 | 6/2016 |

OTHER PUBLICATIONS

K9 Sport Sack: Because Dogs Just Wanna to Have Fun! posted at missmollysays.com, posted on Feb. 26, 2017, online, URL: https://missmollysays.com/k9-sport-sack-because-dogs-just-wanna-have-fun/ (Year: 2017).

K9 Sport Sack, posted at www.bonesps.com, no posting date available, online, URL:https://www.bonesps.com/collections/vendors?q=K9%20Sport%20Sack (Year: 2018).

JPO Ref. No. HB08021181, Outside, 9th, vol. 21, p. 150, Sep. 30, 1996, 1 page.

JPO Ref. No. HH13021686, S Design Gazette (DE), Nov. 10, 2000, 1 page.

JPO Ref. No. HA13021582, Tokusengai, 1st, vol. 24, p. 175, Jan. 1, 2002, 1 page.

JPO Ref. No. HC14042642, General Catalog, E-Motion, p. 28, JPO documented on Sep. 27, 2002, 1 page.

JPO Ref. No. HC15040837, Adventure Travel, The North Face Catalog Fall & Winter 2003-2004, p. 53, JPO documented on Oct. 24, 2003, 1 page.

JPO Notification of List of References for JP Design Registration Application No. 2018-020511.

Ytonet Pet Carrier Backpack, available at amazon.com, earliest date available Nov. 30, 2018 [online], site visited Dec. 9, 2021, Available from the internet URL: https://www.amazon.com/dp/B07FY4561Q?th=1 (Year: 2018).

K9 Sport Sack Evolution, available at youtube.com, posted May 22, 2020 [online], site visited Dec. 9, 2021, Available from the internet URL: https://www.youtube.com/watch?v=zGWK70RMVQM (Year: 2020).

Backpack, walmart.com, date not available [online], site visited Dec. 9, 2021, Available from the internet URL: https://www.walmart.com/ip/Anself-Pet-Backpack-Dog-Cat-Carrier-Double-Zip-Clear-Window-Side-Pockets-Travel-Shoulder-Bag-Open-Doors-Comfortable-Travelling-Hiking-Outdoor-Use/397323749.

K9 Sport Sack Air 2, available at k9sportsack.com, earliest customer review date Feb. 24, 2020 [online], site visited Dec. 9, 2021, Available from the internet URL: https://www.k9sportsack.com/products/air-2 (Year: 2020).

K9 Sport Sack Post, available at facebook.com, posted Sep. 3, 2019 [online], site visited Dec. 9, 2021, Available from the internet URL: https://www.facebook.com/k9sportsackusa/photos/a.1908221172781963/2427074830896592/?type=3 (Year: 2019).

K9 Sport Sack Post, available at facebook.com, posted Mar. 1, 2020 [online], site visited Dec. 9, 2021, Available from the internet URL: https://www.facebook.com/k9sportsackusa/photos/a.1908221172781963/2585534958383911/?type=3 (Year: 2020).

Pets Carrier Backpack, available at nxills.com, date not available [online], site visited Dec. 9, 2021, Available from the internet URL: https://www.nxills.com/index.php?main_page=product_info&products_id=794974.

K9 Sport Sack Post, available at facebook.com, posted Jun. 1, 2018 [online], site visited Dec. 9, 2021, Available from the internet URL: https://www.facebook.com/k9sportsackusa/photos/a.1606811192922964/2095610264043052/?type=3 (Year: 2018).

WOYYHO Pet Dog Carrier Backpack, available at amazon.com, earliest date available Oct. 17, 2020 [online], site visited Dec. 9, 2021, Available from the internet URL: https://www.amazon.com/dp/B08L7RFYXG?tag=upgrapoint-20&linkCode=ogi&th=1 (Year: 2020).

Kurgo G-Train Backpack, available at chewy.com, earliest customer review date May 14, 2019 [online], site visited Dec. 9, 2021, Available from the internet URL: https://www.chewy.com/kurgo-g-train-airline-approved-dog/dp/190589? (Year: 2019).

(56) References Cited

OTHER PUBLICATIONS

Herkey the Cavalier's K9 Sport Sack Adventure 2019, available at youtube.com, posted Apr. 25, 2019 [online], site visited Dec. 9, 2021, Available from the internet URL: https://www.youtube.com/watch?v=wxGILs-DsiE (Year: 2019).
K9 Sport Sack Trainer, available at amazon.com, earliest customer question date Dec. 1, 2019 [online], site visited Dec. 9, 2021, Available from the internet URL: https://www.amazon.com/K9-Sport-Sack-Adjustable-Veterinarian/dp/B07XYK9N3G?th=1 (Year: 2019).
PawRoll Dog Carrier Backpack, available at pawroll.com, earliest customer review date Jan. 26, 2018 [online], site visited Dec. 9, 2021, Available from the internet URL: https://pawroll.com/products/pawroll-dog-backpack-carrier? (Year: 2018).
K9 Sport Sack Trainer, available at k9sportsack.com, earliest customer review date Jan. 2, 2020 [online], site visited Dec. 9, 2021, Available from the internet URL: https://www.k9sportsack.com/products/k9-sport-sack-trainer (Year: 2020).
Outward Hound Carrier, available at amazon.com, earliest date available Apr. 30, 2012 [online], site visited Dec. 9, 2021, Available from the internet URL: https://www.amazon.com/Outward-Hound-Pooch Pouch-Carrier-Backpack/dp/B0081XIJ9M? (Year: 2012).
K9 Sport Sack Air Trainer, available at petco.com, date not available [online], site visited Dec. 9, 2021, Available from the internet URL: https ://www.petco.com/shop/en/petcostore/product/k9-sport-sack-air-trainer-green-backpack-pet-carrier-12-1-x-11-w-x-22-h-3161467?.
K9 Sport Sack: Unique Dog Transportation Bag, available at www.kickstarter.com, posted Apr. 26, 2013 [online], available from the Internet URL: https://www.kickstarter.com/projects/1034052737/k9-sport-sack-unique-dog-transportation-bag?ref=discovery&term=k9%20sport%20sack.
Ruffit Dog Carrier, available at amazon.com, earliest customer review date Dec. 12, 2017 [online], site visited Apr. 20, 2022.
K9 Sport Sack Knavigate, available at k9sportsack.com, earliest customer review date Dec. 15, 2020 [online], site visited Dec. 9, 2021, Available from the internet URL: https://www.k9sportsack.com/products/k9-sport-sack-knavigate (Year: 2020).
K9 Sport Sack Post, available at facebook.com, posted Dec. 29, 2018 [online], site visited Dec. 9, 2021, Available from the internet URL: https://www.facebook.com/k9sportsackusa/photos/a.1908221172781963/2262498034020940/?type=3 (Year: 2018).
The All New KNAVIGATE, available at youtube.com, posted Dec. 1, 2020 [online], site visited Dec. 9, 2021, Available from the internet URL: https://www.youtube.com/watch?v=hfKOryG2z4o (Year: 2020).
Tirrinia Large Pet Backpack, available at amazon.com, earliest date available Nov. 30, 2018. [online], site visited Dec. 9, 2021, Available from the internet URL: https://www.amazon.com/gp/product/B0797DGZ38/?th= 1 (Year: 2018).
WLDOCA Dog Carrier Backpack, available at amazon.com, earliest date available Mar. 14, 2019 [online], site visited Dec. 9, 2021, Available from the internet URL: https://www.amazon.com./WLDOCA-Carrier-Backpack-Adjustable-Motorcycle/dp/B08KVXPTHR?th=1 (Year: 2019).
International Search Report for International Application No. PCT/US2017/063130 dated Mar. 12, 2018, 3 pages.
International Search Report for International Application No. PCT/US2019/047562 dated Dec. 4, 2019, 3 pages.
International Search Report for International Application No. PCT/US2021/048299 dated Nov. 29, 2021, 10 pages.
International Search Report for International Application No. PCT/US2022/012588 dated Apr. 22, 2022, 12 pages.
Extended European Search Report issued Jun. 10, 2020; in EP Application No. 17874238.3 filed Nov. 22, 2017, 9 pages.
Extended European Search Report issued Apr. 7, 2022; in EP Application No. 19851294.9 filed Aug. 21, 2019; 9 pages.
Bushcraft USA Forums, Mystery Ranch Comparison—Sweet Pea vs. the 3 Day Assault Pack, https://web.archive.org/web/20160926234313/http://bushcraftusa.com:80/forum/threads/mystery-ranch-comparison-sweet-pea-vs-the-3-day-assault-pack.93311/, Sep. 8, 2016, 14 pages.
Chinese Third Office Action for Application No. 2019800642964 dated Jan. 20, 2023, 15 pages.
Gear Lab Reviews, Eagle Creek Deviate 60 Review | Tested by GearLab, https://www.outdoorgearlab.com/reviews/travel/travel-backpack/eagle creek-deviate-60, (Jun. 8, 2015, 5 pages.
Gear Lab, Deuter Quantum 70+10 Review, https://www.outdoorgearlab.com/reviews/travel/travel-backpack/deuter-quantum-70-plus-10, (Jun. 8, 2015), 5 pages.
Gossamer Gear Mariposa 60 Backpack, available at youtube.com, posted Mar. 29, 2022 [online], site visited Apr. 27, 2022, available from the internet URL: https://www.youtube.com/walch?v=pbzkBVvXAIA (Year: 2022).
K9 Sport Sack, The World's Most Unique Dog Bag Carrier K9 Sport Sack 2, , https://web.archive.org/web/20150521040634/http://www.k9sportsack.com:80/, (Jan. 7, 2012), 3 pages.
K9 Sport Sack: Unique Dog Transportation Bag, https://www.kickstarter.com/projects/1034052737/k9-sport-sack-unique-dog-transportation-bag, (Apr. 26, 2013, 10 pages.
Osprey Aether 55 Pack, available at moosejaw.com, earliest customer review date Apr. 2021 [online], site visited Apr. 27, 2022, available from the internet URL: https://www.moosejaw.com/producl/osprey-aether-55-pack_10499354? (Year: 2021).
Ozark Trail 45 Itr Backpacking Backpack, available at walmart.com, earliest customer review date Nov. 17, 2019 [online], site visited Apr. 27, 2022, available from the internet URL: https://www.walmart.com/ip/Ozark-Trail-45-Itr-Backpacking-Backpack-Gray/565060930 (Year: 2019).
Rover 2 | Big Dog Carrier & Backpacking Pack, available at k9sportsack.com, earliest customer review date Feb. 3, 2021 [online], site visited Apr. 27, 2022, available from the internet URL: https://www.k9sportsack.com/products/rover-2-dog-carrier-backpacking-pack (Year: 2021).
Ruffit, First Front Facing Dog Carrier, https://web.archive.org/web/20161006020255/http:/ruffitusa.com/, (Mar. 12, 2015), 4 pages.
Tough Traveler, Dog Perch Backpack, Gear Lab Reviews, Eagle Creek Deviate 60 Review | Tested by GearLab, https://web.archive.org/web/20160315204426/http://www.toughtraveler.com/dogbags.asp, (Jun. 8, 2015, 5 pages, (Oct. 28, 2004), 5 pages.
Youtube, "K9 Sport Sack Rover Dog Backpack Carrier Review and Testing", Posted by "Top Dog Tips" on Sep. 8, 2019. (https://www.youtube.com/watch?v=3ISHSi09L5M) (Year: 2019).
Chinese Second Office Action for Chinese Application No. 202210155869.8, dated Nov. 17, 2023, 22 pages with translation.
K9 Sport Sack Walk-On, posted at amazon.com, first available Aug. 18, 2020, retrieved on May 10, 2023, online, https://www.amazon.com/K9-Sport-Sack-Carrier-Backpack/dp/B09S5RXPLG (Year: 2020).
Knavigate, posted at k9sportsack. com, first available Dec. 15, 2020, retrieved on May 10, 2023, online, https://www.k9sportsack.com/products/k9-sport-sack-knavigate?variant=32040903180346 (Year: 2020).
Walk-on with harness & storage, posted atk9sportsack. com, first available Feb. 14, 2022, retrieved on May 10, 2023, online, https://www.k9sportsack.com/collections/dog-carriers/products/walk-on-with-harness-storage?variant=39529235316794 (Year: 2022).
Chinese Final Office Action for Chinese Application No. 202210155869.8, dated Feb. 27, 2024, 13 pages with translation.
Canadian Requisition by the Examiner for Canadian Application No. 3,044,852, dated Apr. 24, 2024, 7 pages.
European Extended Search Report and Opinion for European Application No. 23196684.7, dated Jun. 10, 2024, 8 pages.
International Search Report for International Application No. PCT/US19/47562, mailed Dec. 4, 2019, 3 pages.
International Written Opinion for International Application No. PCT/US19/47562, mailed Dec. 4, 2019, 7 pages.
K9 Sport Sack: Unique Dog Transportation Bag, available at www.kickstarter.com, posted Apr. 26, 2013 [online], available from the Internet URL: https:llwww.kickstarter.com/projects/1034052737/k9-sport-sack-unique-dog-transportation-bag? ref=discovery&term=k9%20sport%20sack.

(56) References Cited

OTHER PUBLICATIONS

Packable Daypacks; https://www.youtube.com/watch?v=AvmKwaUaiUg ; Pack Hacker; Mar. 5, 2020.
Canadian Requisition by the Examiner for Canadian Application No. 3,193,311, dated Jun. 19, 2024, 3 pages.

* cited by examiner

CONVERTIBLE PET-CARRYING AND BACKPACKING BACKPACK

BACKGROUND

The present disclosure relates generally to backpacks. More particularly, the present disclosure relates to backpacks that are convertible from a pet-carrying backpack to a backpacking backpack.

Many people enjoy keeping pets for the companionship, help, and/or friendship that they provide. Pets, of course, require substantial time and care from their owners to ensure that they are well cared for. Sometimes, pet owners would like to travel, hike, or participate in other activities which their pets are not capable of due to the pet's size, age, or various health issues. Many pet owners also prefer not to leave their pets in the care of friends or commercial pet care facilities while participating in such activities. Accordingly, such pet owners are in need of a solution that allows them to participate in activities they find enjoyable while being able to bring along their pet companions that may not otherwise be capable of joining with them.

Solutions for bringing pets along on such activities have been developed such as those set forth in U.S. Pat. No. 10,617,096 which issued on Apr. 14, 2020, and in U.S. patent application Ser. No. 17/008,479, the contents of each of which are incorporated by reference in their entirety herein. It is advantageous, such as for cost savings, for a user who purchases a pet-carrying backpack to be able to use the backpack for other purposes to avoid the need for purchasing multiple backpacks for different applications and activities.

BRIEF SUMMARY

It has been thus recognized that it would be advantageous to develop a pet-carrying backpack that is convertible to a backpacking backpack to allow for uses in other applications and activities. This allows a user to avoid the need for purchasing multiple different backpacks for specific applications.

The disclosure sets forth a backpack that is convertible from a pet-carrying backpack to a backpacking backpack and a method for converting the backpack. A pet-carrying backpack as described herein in a backpack configured to carry an animal such as a dog or cat that people generally keep as pets. A backpacking backpack refers to a backpack that is configured to carry gear or other items other than an animal. The term "backpacking backpack" does not necessarily mean the backpack is only useful for backpacking, but is used to denote a backpack for use in carrying gear or other items other than a pet.

In one example, a convertible pet-carrying and backpacking backpack comprises a backpack body defining one or more internal compartments and an open top operable to allow a head of a pet to extend therethrough. The backpack body further comprises shoulder straps extending from the front of the backpack body, and paw holes disposed on the front of the backpack body above the shoulder straps. The paw holes are operable to allow paws of the pet to extend therethrough.

The backpack can further comprise an accessory bag operable in a first position where the clip-on bag extends from the back of the backpack body so that the backpack is in a pet-carrying configuration, and a second position where the accessory bag covers the open top of the backpack body so that the backpack is in a backpacking configuration.

In one example, the accessory bag comprises a clip-on bag that comprises upper attachment straps and lower attachment straps operable to selectively attach the clip-on bag and detach the clip-on bag from the backpack body. The backpack can comprise conversion guide loops disposed on the backpack body. The upper attachment straps of the clip-on bag can extend through the conversion guide loops so that the clip-on bag is oriented in the second position. The conversion guide loops can be disposed on the front of the backpack body above the shoulder straps and below the paw holes. In the second position, the clip-on bag covers the paw holes preventing water from entering the one or more internal compartments through the open top and the paw holes.

The backpack can further comprise waist straps operable to transfer weight of the backpack to the waist or hips of a user. The backpack can also comprise a waste bag dispenser that has a bag container sized and configured to receive and store one or more waste bags, a recloseable opening in communication with the bag container to facilitate loading and unloading of the one or more waste bags into and out of the bag container, and an outlet in communication with the bag container for facilitating the dispensing of the one or more waste bags from the bag container. The outlet can comprise a grommet, and the grommet can have one or more resilient flaps that function to impart a clamping force to a waste bag being dispensed through the grommet.

In another example, a pet-carrying backpack can comprise a backpack body defining one or more internal compartments and an open top operable to allow a head of a pet to extend therethrough. The backpack can further comprise shoulder straps extending from the front of the backpack body, and paw holes disposed on the front of the backpack body above the shoulder straps. The paw holes are operable to allow paws of the pet to extend therethrough. The backpack can further comprise a waste bag dispenser having an outlet operable to facilitate a waste bag disposed in the waste bag dispenser being removed from the waste bag dispenser through the outlet.

The backpack can comprise waist straps extending from the backpack body. The waist straps are operable to transfer weight of the backpack to the waist or hips of a user. The waste bag dispenser can be disposed on the waist straps.

The backpack can comprise a removable hood operable to attach to and detach from the backpack body to protect the head of the pet extending therethrough. The shoulder straps can be vertically adjustable along the front of the backpack body. The backpack can comprise a vertical zipper extending along the back of the backpack body to facilitate ingress and egress of the pet to and from the backpack. A contouring strap can extend across the vertical zipper.

The disclosure further sets forth a method of converting a pet-carrying backpack to a backpacking backpack. The method can comprise positioning a clip-on bag from a first position disposed at a rear of a backpack body and placing the clip-on bag in a second position disposed over an open top of the backpack body. The clip-on bag in the second position can cover the open top and paw holes disposed on the front of the backpack body above shoulder straps extending from the front of the backpack body. The clip-on bag can prevent water from entering the open top and the paw holes while in the second position. The method further comprises securing the clip-on bag in the second position.

The clip-on bag can be removed from the first position by unclipping attachment straps of the clip-on bag from corresponding receiving clips disposed on the backpack body. The clip-on bag can be placed in the second position by feeding the attachment straps of the clip-on bag through conversion guide loops disposed on the front of the backpack body above the shoulder straps and below the paw holes. The clip-on bag is secured in the second position by attaching the attachment straps to the corresponding receiving clips while the attachment straps are disposed through the conversion guide loops.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
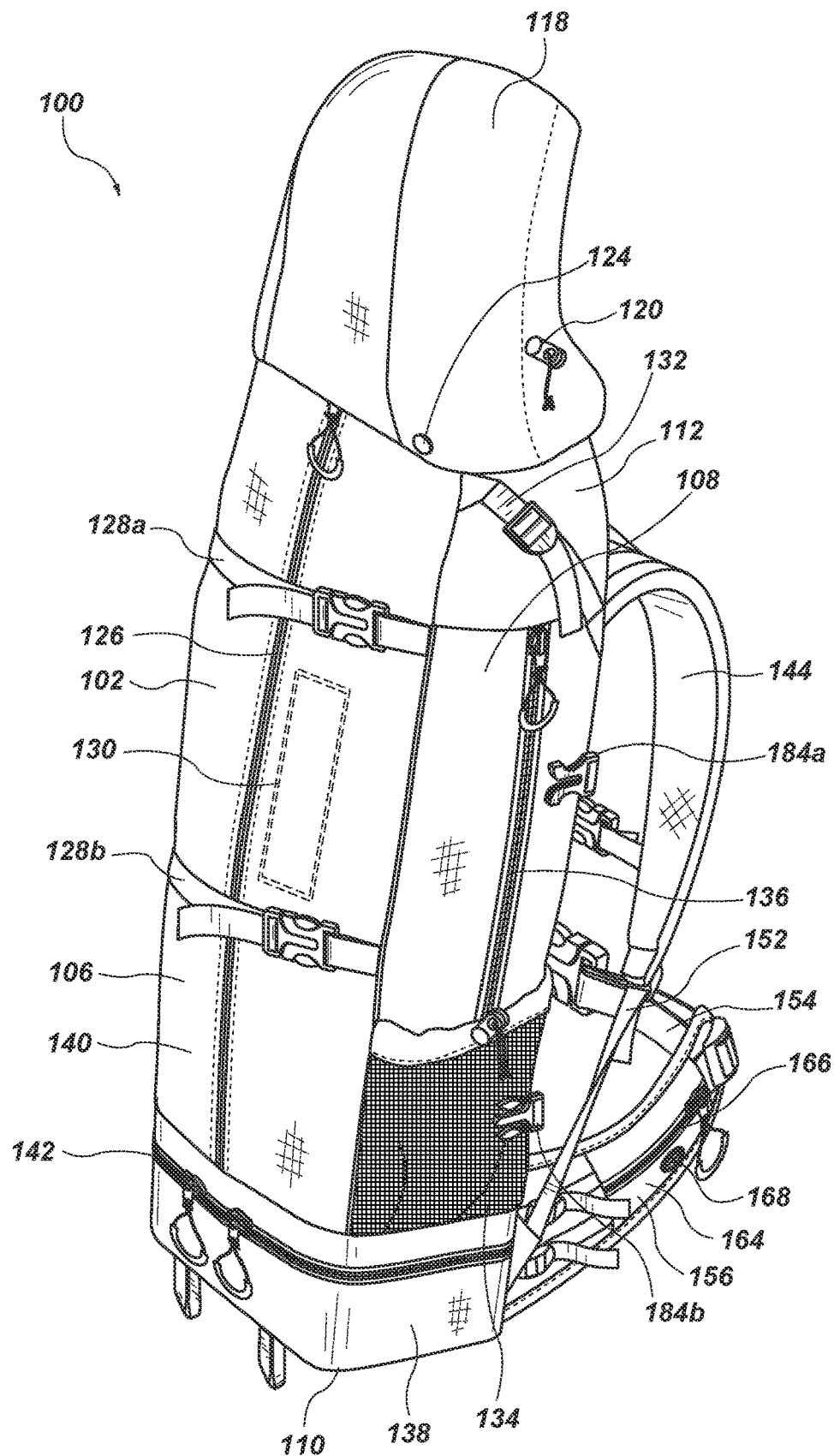
FIG. 1 is a rear, right isometric view of a convertible pet-carrying and backpacking backpack in accordance with an embodiment of the present invention.
Figure 2:
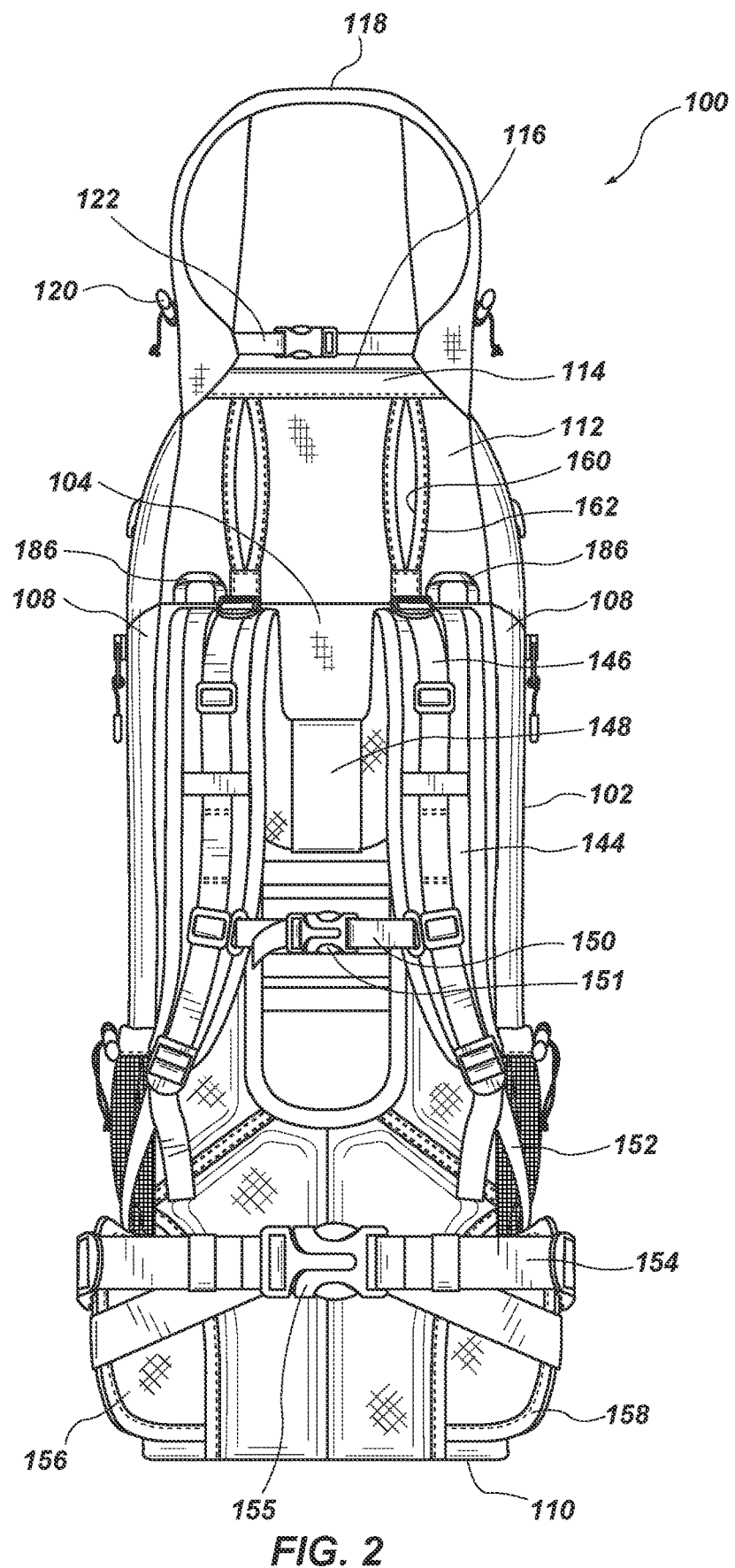
FIG. 2 is a front view of the convertible pet-carrying and backpacking backpack of FIG. 1.

Reference will now be made to the exemplary embodiments illustrated, and specific language will be used herein to describe the same. It will nevertheless be understood that no limitation of the scope of the invention is thereby intended.

DETAILED DESCRIPTION

As illustrated in FIGS. 1-4, a convertible pet-carrying and backpacking backpack, indicated generally as backpack 100, in an example implementation is provided. The backpack 100 shown in the figures is merely one example of a backpack that can be converted from a pet-carrying backpack to a backpacking backpack in accordance with the technology discussed herein and is not intended to be limiting in any way as other designs and configurations of backpacks can be utilized. The backpack 100 comprises a backpack body 102 that defines one or more interior compartments. The backpack body 102 can comprise a front panel 104, a rear panel 106, side panels 108 disposed between the front and rear panels, and a bottom panel 110 connecting to each of the front, rear, and side panels 104, 106, 108, respectively. These panels 104, 106, 108, 110 can be formed separately and can be attached or assembled together (such as by sewing, fabric welding, adhesives, etc.). One or more of the panels 104, 106, 108, 110 can also be formed integrally (e.g., out of a single piece of material manufactured to form the panels). The fabric used to form the panels 104, 106, 108, 110 can comprise any suitable material providing sufficient durability and comfort to a user and to a pet.

In one example, the backpack body 102 can comprise an internal frame (not shown). The internal frame can provide rigidity and support to the backpack 100 to provide comfort to the user and to a pet riding in the backpack 100. The internal frame can provide a structure to the backpack such that one or more of the panels 104, 106, 108, 110 does not collapse in on itself. In one aspect, the internal frame can provide structure within at least the front panel 104 of the backpack 100. The internal frame can be configured in any number of ways to provide support to any combination of the front, rear, and side panels 104, 106, 108, respectively. In another example, the backpack body 102 can be devoid of an internal frame, such as in those cases where the backpack 100 is smaller in size (e.g., those used to accommodate smaller pets) than its larger counterparts (e.g., those designed to accommodate comparatively larger pets). In still another example, the backpack 100, and particularly one or more components (e.g., front, rear, and side panels 104, 106, 108, respectively) of the backpack body 102, can comprise one or more external stays or other rigid or flexible support members configured to provide support to the backpack body 102. These external stays can be fixed or releasably coupled to the backpack body 102 and routed along various paths to provide the necessary or desired support to the backpack body 102.

The backpack body 102 can comprise a top portion 112 operable to allow the head of the pet to protrude therethrough. The top portion 112 can be defined by a top portion of each of the front panel 104, the rear panel 106 and side panels 108, or the top portion 112 can be defined by separate panels formed as part of the front panel 104, the rear panel 106, and side panels 108. The top portion 112 can comprise a collar 114. The collar 114 is operable to fit around and surround the neck of the pet within the backpack 100 upon the pet extending its head through the top portion 112 and can be made to be adjustable so as to provide a desired fit that is the most appropriate and comfortable for the pet. The collar 114 defines an open top 116 through which the pet's head extends. The open top 116 facilitates a comfortable viewing position for the pet during use of the backpack 100 as a pet carrier.

In some examples, the backpack 100 can comprise a hood 118 that can be attached to the top portion 112 of the backpack 100. The hood 118 is operable to protect a pet from precipitation such as rain or snow, to provide warmth to the pet, and/or to shade the pet from the sun. In some examples, the hood 118 can comprise an elastic adjustment cord and stop 120 to help form the hood 118 around the pet's head. The hood 118 can also comprise a chin strap 122. The chin strap 122 is operable to help secure the hood 118 over a pet's head and to facilitate adjustment of the hood 118 around the pet's head.

The hood 118 may be selectively attachable and detachable from the backpack body 102. In one example, the hood 118 can comprise one or more snaps (e.g., see snap 124) to facilitate attachment of the hood 118 to the backpack body 102. Other attachment mechanisms could also be used including a zipper, clips, buttons, etc. The hood 118 can be formed of any suitable material and can be configured to be water resistant.

The backpack body 102 is configured to facilitate efficient ingress of a pet into the backpack 100, as well as efficient easy egress of the pet out of the backpack 100. To facilitate this, the backpack body 102 can comprise a vertical zipper 126 or other fasteners (e.g., snaps) or fastening mechanisms (e.g., plastic zip-type fastening mechanism). The vertical zipper 126 can extend vertically at least partially along the rear panel 106 of the backpack body 102. The vertical zipper 126 allows the rear panel 106 to at least partially separate and open to provide a larger opening through which a pet can be passed to facilitate more efficient insertion of the pet into and removal of the pet from the backpack 100 as compared with the rear panel 106 not having a vertical zipper 126. The vertical zipper 126 can extend along a majority of the length of the rear panel 106. Where there are multiple internal compartments defined in the backpack body 102, the vertical zipper 126 can extend along an entire length or substantially the entire length of a pet-carrying compartment 140 (i.e., a compartment operable to carry the pet) defined in the backpack body 102.

To provide added support and comfort for a pet within the backpack 100, the backpack body 102 can comprise an upper contouring strap 128a and a lower contouring strap 128b. The upper and lower contouring straps 128a, 128b are operable to shape the backpack body 102 to conform to a pet or other items contained therein. The upper and lower contouring straps 128a, 128b each comprise ends that can be secured to respective side panels, such that the upper and lower contouring straps 128a, 128b span or are disposed across the rear panel 106 in this example. So positioned, the upper and lower contouring straps 128a, 128b can additionally provide support to a lumbar region of the pet that is being carried within the backpack 100. Advantageously, the upper and lower contouring straps 128a, 128b are sized and configured to cross over the vertical zipper 126. In this example, the upper and lower contouring straps 128a, 128b are oriented substantially horizontally (as viewed in the drawings), or stated differently, substantially perpendicular to the vertical zipper 126. The upper and lower contouring straps 128a, 128b thus oriented, and upon being suitably adjusted, are operable to bear at least some of the loads imparted to the backpack 100 upon being loaded (e.g., with a pet and/or other items), which can function to relieve, to some degree, the loading and pressure placed on the rear panel 106 and the vertical zipper 126. This increases the safety and durability of the backpack 100.

In some embodiments, the backpack 100 can comprise a patch receiving area 130 disposed on the backpack body 102 configured to receive, support, and outwardly display a patch or other indicia-bearing object. In this example, the patch receiving area 130 is disposed on the rear panel 106 of the backpack body 102. The patch receiving area 130 can comprise one side of a hook and loop fastener to receive and secure a patch that comprises the other side of the hook and loop fastener. Other attachment mechanisms for receiving patches such as snaps, buttons, reusable adhesives, or the like can also be used.

Figure 3:
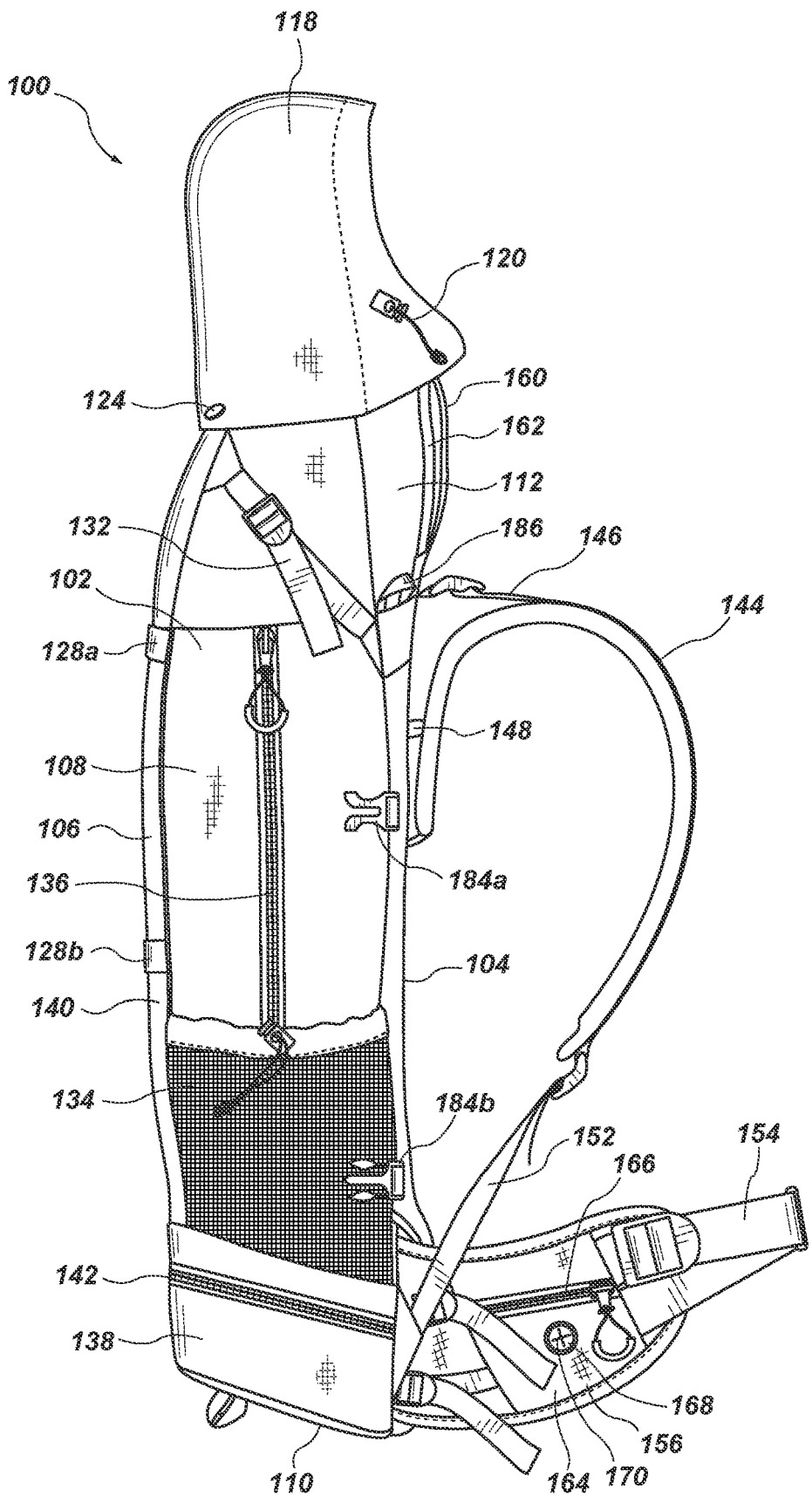
FIG. 3 is a right-side view of the convertible pet-carrying and backpacking backpack of FIG. 1.
Figure 4:
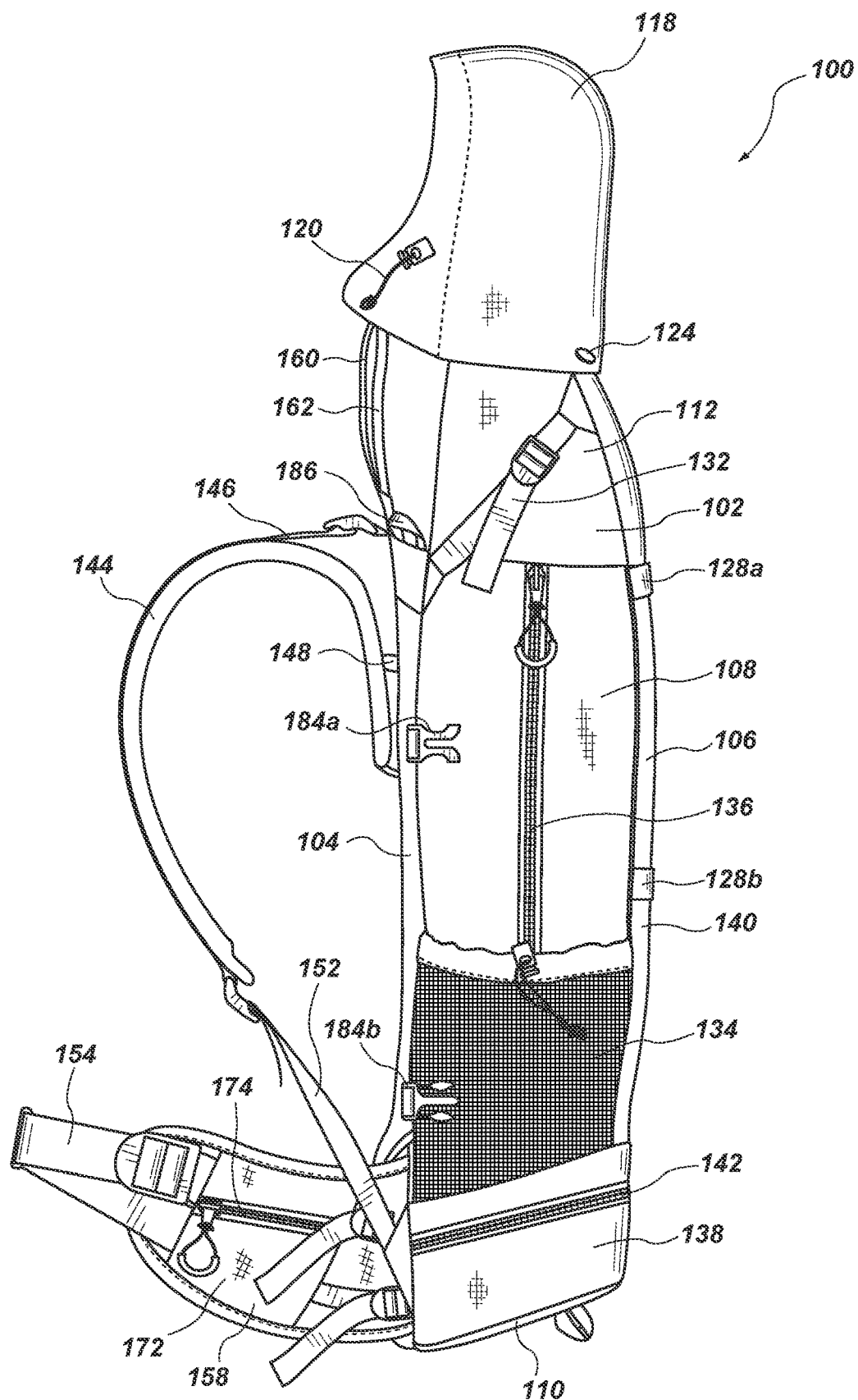
FIG. 4 is a left-side view of the convertible pet-carrying and backpacking backpack of FIG. 1.

The backpack body 102 can comprise additional contouring straps to help shape the backpack body 102 to support and conform to items to be carried within the backpack 100. In one example, the backpack body 102 comprises side contouring straps 132 disposed on and/or extending over side panels 108 of the backpack body 102. The side contouring straps 132 can be oriented at an oblique angle (i.e., at an orientation that is neither vertical nor horizontal) relative to the front panel 104 as shown in FIGS. 3 and 4. This placement position and orientation allows the backpack body 102 to be contoured in a different direction than provided by the upper and lower contouring straps 128a, 128b, and provides further support and comfort to a pet or other items being carried in the backpack 100.

The backpack 100 can further comprise one or more side pockets (e.g., see side pockets 134) disposed over the side panels 108, respectively. The side pockets 134 can be comprised of a mesh or any other type of material and can provide accessible storage for a user, such as to store bottles or other items within easy reach.

The side panels 108 can comprise one or more ventilation ports. In the example shown, the side panels 108 can comprise a side ventilation port 136 controlled by a zipper or other fastening mechanism. When opened, the side ventilation port 136 allows air flow into the pet-carrying compartment 140. Advantageously, when the side pockets 134 are formed from a mesh material, the side pockets 134 do not significantly inhibit or restrict air flow able to flow into the pet-carrying compartment 140 allowing for enhanced ventilation. In some examples, the side ventilation ports 136 can be configured to port air directly into the pet-carrying compartment 140. In some examples, the side ventilation ports 136 can further comprise a mesh layer that is formed as a part of the side panels 108, and that is exposed upon actuating the zipper controlling the ventilation port.

In some examples, the backpack body 102 can define multiple compartments. For example, the backpack body 102 can comprise a lower compartment accessible by an access zipper 142. The lower compartment is disposed below the pet-carrying compartment 140. The pet-carrying compartment 140 and the lower compartment 138 can be separated by a pet-carrying platform on which the pet sits within the pet-carrying compartment 140. In some examples the size of the lower compartment 138 and the pet-carrying compartment 140 can be based on the size of pet to be carried in the pet-carrying compartment 140. When a small pet is to be carried in the pet-carrying compartment 140, the pet-carrying compartment 140 can be relatively smaller and the lower compartment 138 can be relatively larger. For a backpack 100 configured for smaller pet that has a smaller pet-carrying compartment 140, the pet-carrying platform can be disposed higher within the backpack body 102 as compared to a backpack 100 configured for a larger pet that has a larger pet-carrying compartment 140. Similarly, for a larger pet to be carried within the pet-carrying compartment, the pet-carrying platform can be disposed lower within the backpack body 102 resulting in a relatively smaller lower compartment 138. For very large pets, the lower compartment 138 can be omitted and the backpack body 102 can comprise just the pet-carrying compartment 140 where the bottom panel 110 comprises the pet-carrying platform.

As shown in FIGS. 3 and 4, the bottom panel 110 of the backpack body 102 can be angled so as to create an acute angle with respect to the front panel 104 of the backpack body 102. The pet-carrying platform defining the separation between the pet-carrying compartment 140 and the lower compartment 138 can be configured to be parallel to the bottom panel 110. The acute angle of the bottom panel 110 and the pet-carrying platform can provide added comfort to the pet by keeping the weight of the pet close to a user. Further, in the event that a user wears the backpack 100 too loosely, causing the backpack 100 to sag, the angled pet-carrying platform can remain at least level so that the weight of the pet does not tend to fall away from the user. The angle created by the bottom panel 110 and a line perpendicular to the front panel 104 can be between 10 and 40 degrees.

The backpack body 102 further comprises shoulder straps 144 extending from the front panel 104 of the backpack body. The shoulder straps 144 are operable to be worn by the user to carry the backpack 100. The shoulder straps can be adjustable via upper adjustment straps 146 and tightening straps 152. The upper adjustment straps 146 and tightening straps 152 allow the user to fit the shoulder straps comfortably and securely. The shoulder straps 144 can include padding to provide a comfortable fit to the user.

In some examples, the shoulder straps 144 are adjustable vertically along the front panel 104 of the backpack body 102. For example, the shoulder straps 144 can comprise a floating strap attachment 148 that allows the top of the shoulder straps 144 to be attached at different heights to the front panel 104 of the backpack body 102, which further aids the user in finding a comfortable and secure fit of the shoulder straps 144. The backpack 100 can further comprise a sternum strap 150 that is operable to keep the shoulder straps 144 from separating during use, providing further comfort and security to the user. The sternum strap 150 is connectable via a sternum clip attachment 151.

The front panel 104 can further comprise paw holes 160 disposed in the top portion 112 of the backpack body 102. The paw holes 160 allow the paws or legs of the pet to extend therethrough. The paw holes 160 are disposed on the front panel above the shoulder straps 144. The paw holes 160 orient the pet within the backpack 100 to be front facing. That is, facing the same direction as the user wearing the backpack, or facing in the same direction in which the shoulder straps 144 extend from the front panel 104. This allows the pet to have a good vantage point to participate in a walk, bicycle ride, or other activity with the user. The paw holes 160 can be lined with a resilient liner 162 such as neoprene or polypropylene. The resilient liner 162 reduces any potential irritation the paw holes 160 might have on the paws or legs of the pet in the backpack 100. The paw holes 160 can be formed as slits in the front panel 104 of the backpack body 102 or can be formed in an almond shape as shown. Other shapes such as an oval shape or circular shape can also be used.

The backpack 100 can further comprise waist straps 154 extending from the backpack body. The waist straps 154 are operable to surround the waist of the user at or near the hips to transfer weight of the backpack 100 to the waist or hips of the user. This increases the ergonomics of the backpack 100 and allows the user to comfortably carry heavier loads with the backpack 100 as compared to a backpack without waist straps. The waist straps 154 are selectively joined together via a waist clip attachment 155.

The waist straps 154 comprise a right-side padded portion 156 and a left-side padded portion 158. The right and left-side padded portions 156, 158 provide comfort and support about a user's hips.

The backpack 100 can further comprise a waste bag dispenser 164 operable to house and dispense waste bags, such as the plastic bags a pet owner can carry to collect pet waste while out with her or his pet. In one example, the waste bag dispenser 164 can be supported about any one of (or both of) the right and left-side padded portions 156, 158 of the waist straps 154. However, this is not intended to be limiting in any way as the waste bag dispenser 164 can be located and supported on any part of the backpack 100. In the example shown, the waste bag dispenser 164 can be supported on the right-side padded portion 156, or stated differently, the right-side padded portion 156 can comprise the waste bag dispenser 164.

No matter its location, the waste bag dispenser 164 can comprise a bag container sized and configured to receive and store one or more waste bags therein. The waste bag dispenser 164 can further comprise a recloseable opening 166 in communication with the bag container. The recloseable opening 166 can be openable and closeable via a zipper (or other recloseable mechanism). When open, the recloseable opening provides access to the bag container of the waste bag dispenser 164 for the purpose of loading new waste bags into the bag container or removing the waste bags from the bag container. Once the waste bags are properly loaded into the bag container, the recloseable opening can be closed to secure the waste bags inside the bag container.

The waste bag dispenser 164 can further comprise an outlet operable to dispense one or more waste bags from the bag container. In one example, as shown, the outlet can comprise a grommet 168 defining an opening in communication with the bag container and through which the waste bags can be dispensed. The grommet 168 is operable to dispense a waste bag from the bag container of the waste bag dispenser 164 without opening the recloseable opening 166 via the zipper. Indeed, once loaded into the bag container, a first waste bag can be fed through the grommet a sufficient distance so as to be graspable by a user when needed. In one example, the grommet can comprise one or more resilient flaps 170 that function to impart a clamping force or resistance to the waste bag as it is removed through the grommet 168. For example, the waste bags can be joined together at perforations. Thus, when the first waste bag is removed from the waste bag dispenser 164, the resilient flaps 170 can impart a suitable clamping force to the first waste bag so as to provide a resistance to help the user tear the first waste bag currently being dispensed from a next or second or trailing waste bag at the perforation. Again, the waste bag dispenser 164 is shown in this example as being on the right-side padded portion 156 of the waist straps 154, however, the waste bag dispenser 164 can be disposed or supported on other portions of the backpack 100, such as on a shoulder strap 144, a side panel 108, or any other desired portion of the backpack 100.

The left-side padded portion 156 can comprise a waist pocket 172 for carrying small items that the user can access without removing the backpack 100. The waist pocket 172 can comprise a waist pocket zipper 174 allowing access to the waist pocket 172.

Figure 5:
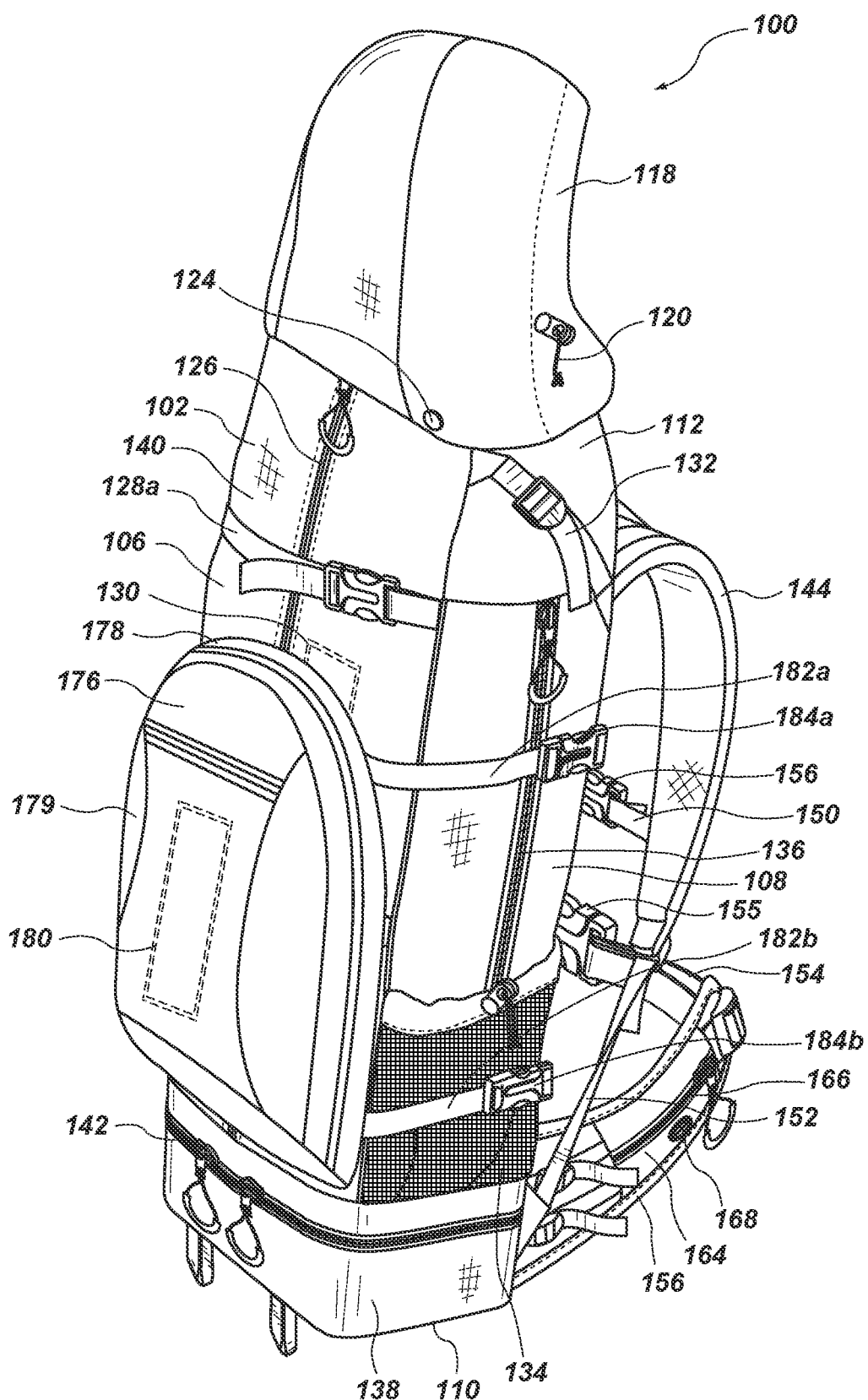
FIG. 5 is a rear, right isometric view of the convertible pet-carrying and backpacking backpack of FIG. 1 showing an accessory clip-on bag attached thereto.

The backpack 100 can comprise accessories that attach to the bag. An example accessory is shown with reference to FIG. 5. In FIG. 5, an accessory bag is shown in the form of a clip-on bag 176 that attaches to the backpack 100. The clip-on bag 176 provides added storage to the backpack 100 and, as explained in more detail below, can facilitate conversion of the backpack 100 from a pet-carrying backpack to a backpacking backpack. It is noted that while a clip-on bag is shown in this example, the accessory bag can be attached to the backpack in many other forms such as via snaps, zippers, button, or other fasteners.

The clip-on bag 176 comprises an access zipper 178 that opens into a clip-on storage compartment 179 defined by the clip-on bag 176. The clip-on bag 176 can optionally comprise a patch receiving area 180 similar to the patch receiving area 130 of the backpack 100. This allows a user to attach a patch to the patch receiving area 130 when the clip-on bag 176 covers the patch receiving area 130 of the backpack 100.

The clip-on bag 176 comprises an upper attachment strap 182*a* and a lower attachment strap 182*b*. The upper and lower attachment straps 182*a*, 182*b* are operable to selectively attach the clip-on bag 176 to the backpack 100. To this end, the backpack 100 comprises an upper receiving clip 184*a* and a lower receiving clip 184*b* that attach to the upper and lower attachment straps 182*a*, 182*b* respectively. The upper receiving clip 184*a* and the lower receiving clip 184*b* can each comprise a different one of a male and female clip to correspond with a female and male clip on a respective upper and lower attachment strap 182*a*, 182*b* to ensure a correct pairing.

With reference to FIGS. 1-9, and as mentioned above, the clip-on bag 176 facilitates conversion of the backpack 100 from a pet-carrying backpack to a backpacking backpack where the backpack 100 is not intended to be used to carry a pet. The clip-on bag 176 can connect to the backpack 100 via the upper and lower attachment straps 182*a*, 182*b* and the upper and lower receiving clips 184*a*, 184*b*. With each of the upper and lower attachment straps 182*a*, 182*b* extending around the side panels 108 of the backpack body 102, the clip-on bag 176 is oriented adjacent to the rear panel 106 on a middle to lower half of the backpack body 102. With the clip-on bag 176 in this position (a pet-carrying position), the backpack 100 can be used as a pet-carrying backpack. This is because the clip-on bag 176 is attached to the backpack body 102 such that it does not interfere with the open top 116 or paw holes 160 of the backpack 100 so that they can be used by the pet being carried in the backpack 100 in the same manner as if the clip-on bag 176 were not present.

It is advantageous for the user to use a backpack (such as backpack 100) for more than just carrying a pet. This way, the user can reduce the number of backpacks she or he owns by being able to use a single backpack for multiple different applications. However, a pet-carrying backpack (such as backpack 100) has openings to accommodate the pet (such as the open top 116 and paw holes 160 of the backpack 100). When the pet-carrying backpack is used without a pet, these openings can expose other items placed into the backpack to harsh or undesirable ambient conditions, such as those caused by sun exposure, rain, snow, etc. Moreover, such openings can expose the contents of the backpack, such that they are visible to others and less secure, thus potentially increasing their chance for theft or tampering. Accordingly, to convert a pet-carrying backpack such as backpack 100 to a backpacking backpack for use without a pet, the openings accommodating the pet should advantageously be covered or substantially covered to protect contents placed into the backpack from exposure to ambient conditions, as well as to conceal them so that they are out of sight. In this example, the accessory bag shown as clip-on bag 176 is operable to be repositioned on the backpack 100 to cover the open top 116 and the paw holes 160 to allow the backpack 100 to be used as a backpacking backpack. To this end, the backpack body 102 can comprise conversion guide loops 186. The conversion guide loops 186 are disposed on the front panel 104 of the backpack body between the side panels 108 and the paw holes 160. The conversion guide loops 186 are disposed above the shoulder straps and adjacent to or below a lower end of the paw holes 160. The conversion guide loops 186 are configured to receive the upper attachment straps 182*a* of the clip-on bag 176 to orient and position the clip-on bag 176 to a position to cover the open top 116 and the paw holes 160 to allow the backpack 100 to function as a backpacking backpack.

Figure 6:
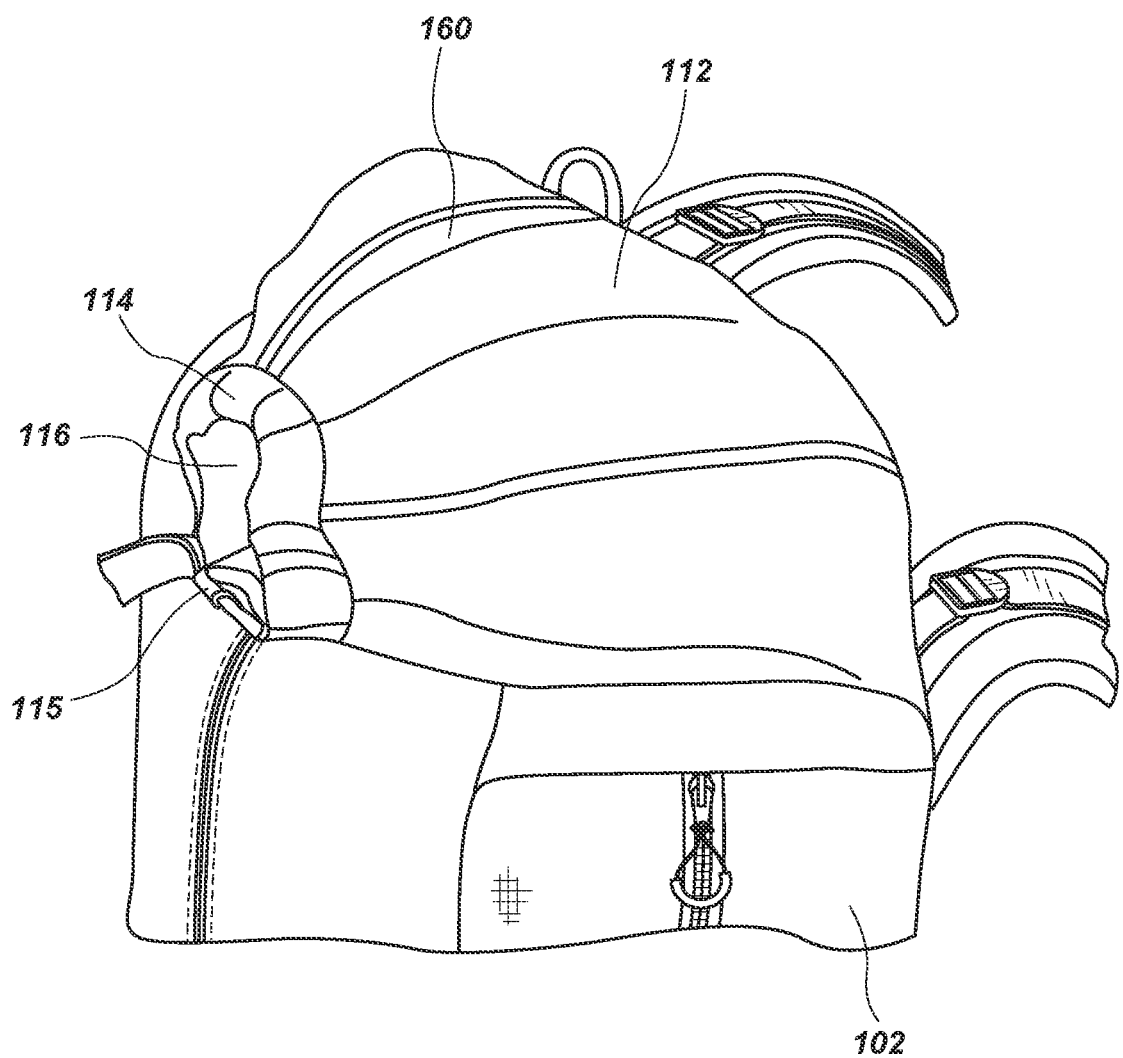
FIG. 6 is an enlarged view of a top portion of the convertible pet-carrying and backpacking backpack of FIG. 1.
Figure 7:
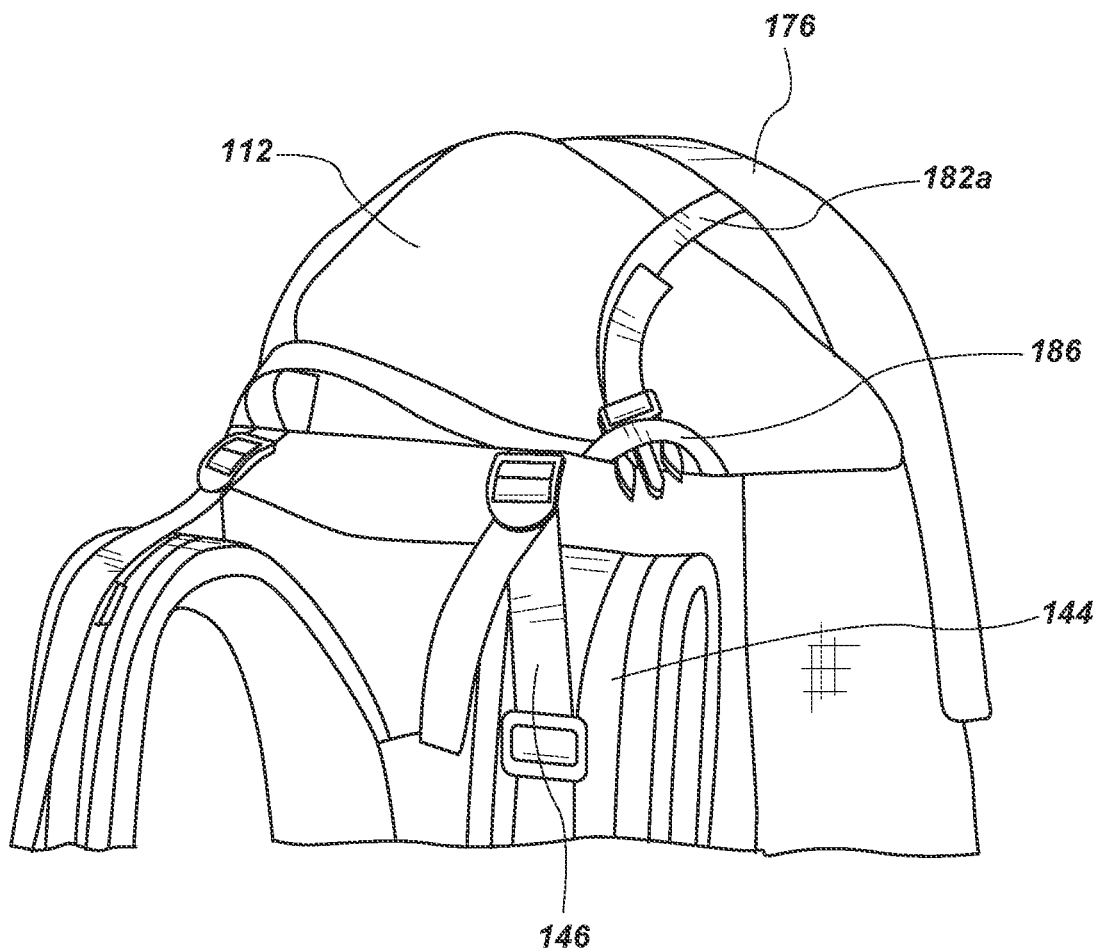
FIG. 7 is an enlarged view of the top portion of the convertible pet-carrying and backpacking backpack of FIG. 1 with the clip-on bag being positioned to convert the backpack from a pet-carrying backpack to a backpacking backpack.

A method for converting the backpack 100 from a pet-carrying configuration to a backpacking configuration will now be explained with reference to FIGS. 6-9. With the hood 118 (see FIGS. 1-5) removed, the top portion 112 of the backpack body 102 can be placed into position for converting the backpack from the pet-carrying configuration to the backpacking configuration. As shown in FIG. 6, the open top 116 can be narrowed or closed as far as possible by cinching the collar 114 using the collar adjustment strap 115. The top portion 112 can then be folded over away from the front panel 104 to pull the paw holes 160 into the position shown in FIG. 6. With the top portion 112 prepared as shown in FIG. 6, the upper attachment straps 182*a* of the clip-on bag 176 can be fed through the conversion guide loops 186, as shown in FIG. 7. This orients the upper attachment straps 182*a* to be fed from above the shoulder straps 144 and over the top portion 112.

Figure 8:
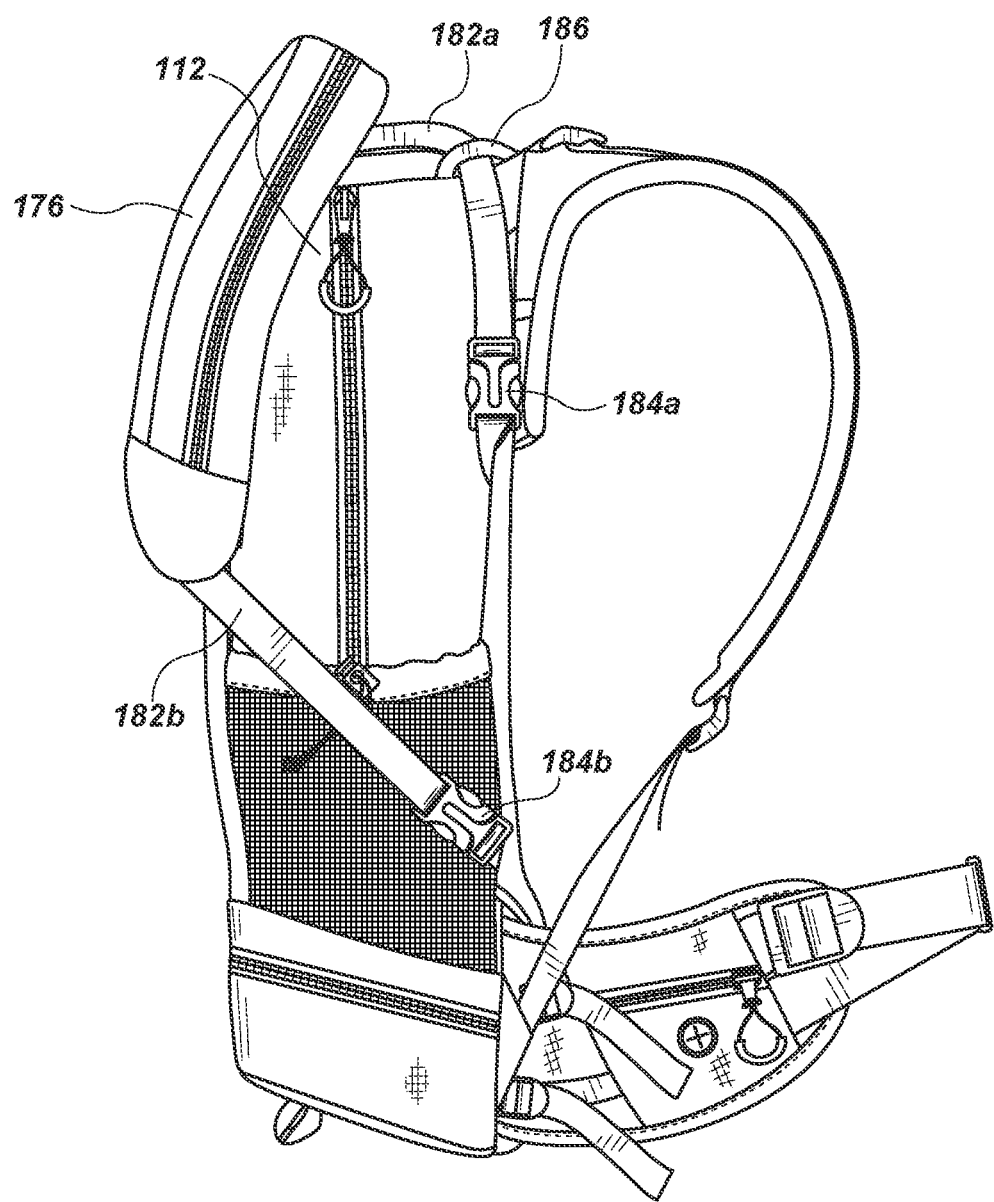
FIG. 8 is a side view of the convertible pet-carrying and backpacking backpack of FIG. 1 showing the clip-on bag in position to convert the backpack from a pet-carrying backpack to a backpacking backpack.
Figure 9:
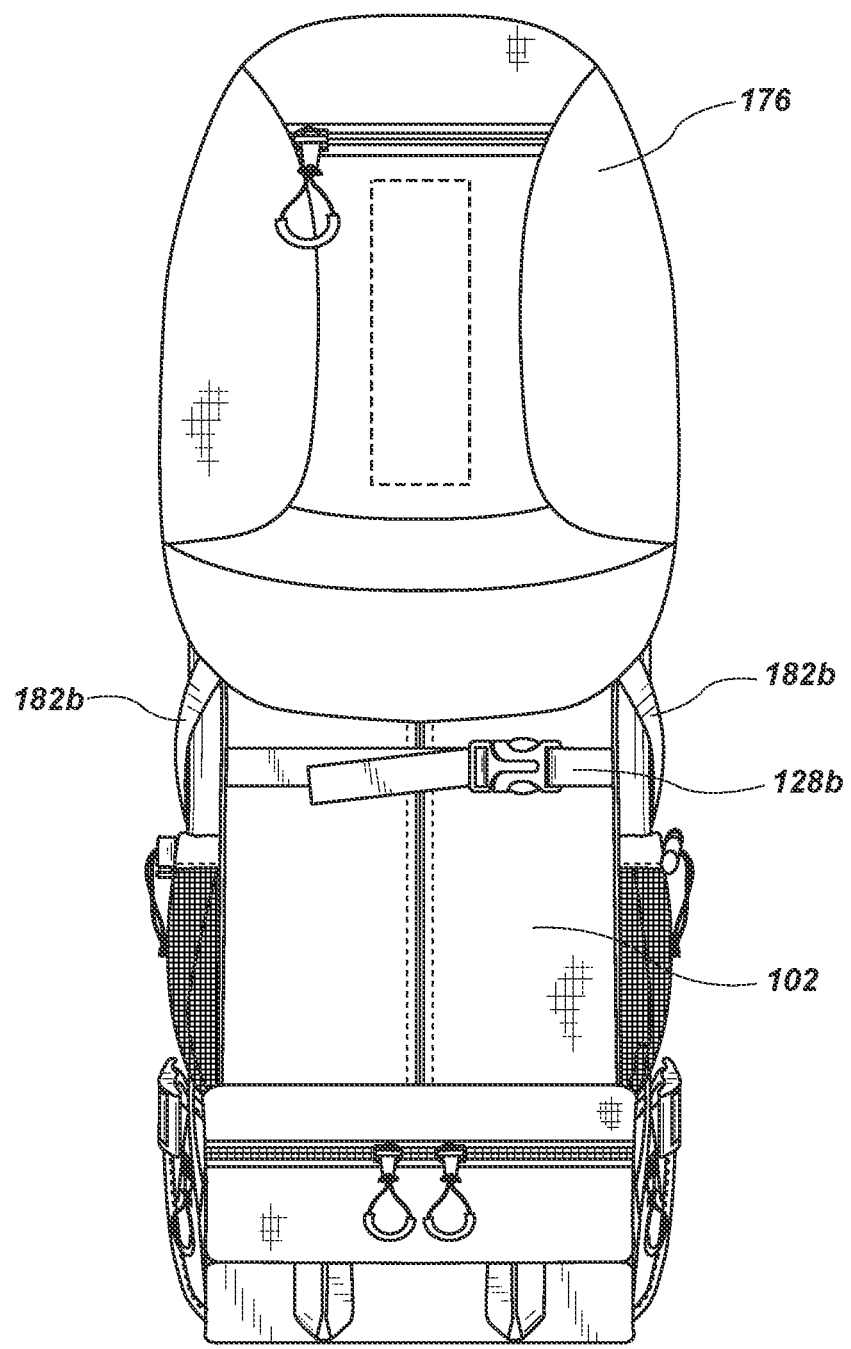
FIG. 9 is a rear view of the convertible pet-carrying and backpacking backpack of FIG. 1 showing the clip-on bag in position to convert the backpack from a pet-carrying backpack to a backpacking backpack.

As shown in FIG. 7, with the upper attachment straps 182*a* of the clip-on bag 176 fed over the top portion 112 and through the conversion guide loops 186. The upper attachment straps 182*a* are then connected to the backpack body 102 via the upper receiving clips 184*a* as shown in FIG. 8. The upper attachment straps 182*a* can then be tightened to pull the clip-on bag 176 into the backpacking position where the clip-on bag 176 substantially covers the top portion 112 (including the open top 116 and the paw holes 160). The lower attachment straps 182*b* can then also be connected to the backpack body 102 via the lower receiving clips 184*b* to secure the clip-on bag 176 in place. FIG. 9 shows a rear view of the clip-on bag 176 in the backpacking position disposed at or adjacent to the top of the backpack body 102. With the clip-on bag 176 in the backpacking position, the clip-on bag 176 covers the open top 116 and the paw holes 160 and prevents water such as in the form or rain or snow as well as sunlight from entering the backpack 100 through the open top 116 and the paw holes 160 allowing the backpack 100 to be effectively used as a backpacking backpack.

To convert the backpack 100 from the backpacking configuration to the pet-carrying configuration, the above steps are reversed, and the clip-on bag 176 is reattached to the backpack body 102 in the pet-carrying position.

The above-described backpack allows a user to utilize the backpack in multiple applications with or without a pet. Indeed, in one aspect the user can carry a pet with the backpack providing the pet a comfortable vantage point during outings. In another aspect, the user can use the backpack without a pet in the backpacking configuration to transport other items while concealing the items and protecting the items from the elements.

Other variations may also be included to provide for conversion of the backpack from pet-carrying configuration to a backpack configuration. For example, one or more flaps can be included on the backpack that are removable or storable on the backpack. The flaps can be removed or stored in the pet-carrying configuration so that the user can carry a pet while the pet has access to the paw holes and the open top of the backpack. When the user wishes to convert the backpack to a backpacking configuration, the flaps can be attached or removed from a storage compartment and can extend over the paw holes and the open top to cover the paw holes and the open top. In this configuration, the backpack can be used in the backpacking configuration.

As another example, while the accessory bag described above is removable and attachable, the accessory bag can also be permanently attached to the backpack. For example, the accessory bag can be attached to the backpack via adjustable straps that can be rerouted without being detached to allow the accessory backpack to move from the pet-carrying configuration to the backpacking configuration.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A convertible pet-carrying and backpacking backpack comprising:
   a backpack body defining one or more internal compartments and an open top operable to allow
   a head of a pet to extend therethrough;
   a collar adjustment strap operable to adjust and cinch the open top of the backpack body;
   shoulder straps extending from a front of the backpack body;
   paw holes disposed on the front of the backpack body above the shoulder straps, the paw holes operable to allow paws of the pet to extend therethrough;
   a contouring strap extending over a side panel of the backpack body, the
   contouring strap configured to shape the backpack body;
   receiving clips disposed on the backpack body; and
   an accessory bag configured to detachably connect to the receiving clips in a first position where the accessory bag is attached to a lower portion of the backpack body on a middle to lower half of the backpack body so that the backpack is in a pet-carrying configuration, and to attach to the receiving clips in a second position where the accessory bag covers the open top of the backpack body so that the backpack is in a backpacking configuration.

2. The convertible pet-carrying and backpacking backpack of claim 1, wherein the accessory bag comprises a clip-on bag that comprises upper attachment straps and lower attachment straps operable to selectively attach the clip-on bag and detach the clip-on bag from the backpack body.

3. The convertible pet-carrying and backpacking backpack of claim 2, further comprising conversion guide loops disposed on the backpack body, wherein when the upper attachment straps of the clip-on bag extend through the conversion guide loops to connect to the receiving clips, the clip-on bag is oriented in the second position.

4. The convertible pet-carrying and backpacking backpack of claim 3, wherein the conversion guide loops are disposed on the front of the backpack body.

5. The convertible pet-carrying and backpacking backpack of claim 4, wherein the conversion guide loops are disposed above the shoulder straps and below the paw holes.

6. The convertible pet-carrying and backpacking backpack of claim 3, wherein when the upper attachment straps of the clip-on bag do not extend through the conversion guide loops to connect to the receiving clips, the clip-on bag is oriented in the first position.

7. The convertible pet-carrying and backpacking backpack of claim 1, wherein the accessory bag covers the paw holes in the second position preventing water from entering the one or more internal compartments through the open top and the paw holes.

8. The convertible pet-carrying and backpacking backpack of claim 1, further comprising waist straps operable to transfer weight of the backpack to the waist or hips of a user.

9. The convertible pet-carrying and backpacking backpack of claim 1, further comprising a waste bag dispenser comprising:
   a bag container sized and configured to receive and store one or more waste bags;
   a recloseable opening in communication with the bag container to facilitate loading and unloading of the one or more waste bags into and out of the bag container; and
   an outlet in communication with the bag container for facilitating dispensing of the one or more waste bags from the bag container.

10. The convertible pet-carrying and backpacking backpack of claim 9, wherein the outlet comprises a grommet.

11. The convertible pet-carrying and backpacking backpack of claim 10, wherein the grommet comprises one or more resilient flaps that function to impart a clamping force to a waste bag being dispensed through the grommet.

* * * * *